United States Patent
Takei et al.

(10) Patent No.: US 7,231,307 B2
(45) Date of Patent: Jun. 12, 2007

(54) TEMPERATURE MEASURING APPARATUS, AND TEMPERATURE CORRECTION PROCESSING DEVICE

(75) Inventors: Youji Takei, Kumagaya (JP); Masao Tsukizawa, Kiryu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/161,659

(22) Filed: Aug. 11, 2005

(65) Prior Publication Data

US 2006/0080056 A1   Apr. 13, 2006

(30) Foreign Application Priority Data

Aug. 11, 2004   (JP) ............................ 2004-234384

(51) Int. Cl.
*G01K 15/00* (2006.01)

(52) U.S. Cl. .................. 702/99; 702/130; 702/131; 374/100; 374/133; 374/126

(58) Field of Classification Search .............. 702/99, 702/104, 130, 134, 136, 131; 600/474, 549; 374/133, 126, 134, 153, 2, 100
See application file for complete search history.

(56) References Cited

U.S. PATENT DOCUMENTS 6,129,673 A * 10/2000 Fraden ..................... 600/474
6,751,497 B2 * 6/2004 Fraden ..................... 600/474

\* cited by examiner

*Primary Examiner*—John Barlow
*Assistant Examiner*—Hien Vo
(74) *Attorney, Agent, or Firm*—Stephen B. Parker; Watchstone P+D, plc

(57) ABSTRACT

In some embodiments, a temperature measuring apparatus is provided with a light receiving portion having a plurality of light receiving units for measuring heat quantity of divided temperature detecting area in a noncontact manner, a thermal sensor for detecting temperature of each of the plurality of light receiving units, a calculation portion for calculating a temperature of each of the divided temperature detecting areas based on the temperature obtained by the thermal sensor and the relative temperature difference obtained by the light receiving portion, a correction information holding portion for holding correction information on known reference temperature of the temperature detecting area and its corresponding calculated result outputted from the calculation portion obtained when heat quantity of the temperature detecting area is set to the reference temperature, and a correction portion for correcting the calculated result of the calculation portion based on the correction information.

11 Claims, 5 Drawing Sheets

TEMPERATURE MEASURING APPARATUS, AND TEMPERATURE CORRECTION PROCESSING DEVICE

CROSS-REFERENCE TO RELATED APPLICATIONS

This application claims priority under 35 U.S.C. §119 to Japanese Patent Application No. P2004-234384 filed on Aug. 11, 2004, the entire disclosure of which is incorporated herein by reference in its entirety.

BACKGROUND OF THE INVENTION

1. Field of the Invention

The present invention relates to a temperature correction processing device for use in a temperature measuring apparatus for measuring temperatures of, for example, human beings or objects by detecting heat ray images of, e.g., far infrared rays irradiated from the human beings or objects. It also related to a temperature measuring apparatus equipped with the temperature correction processing device.

2. Description of the Related Art

The following description sets forth the inventor's knowledge of related art and problems therein and should not be construed as an admission of knowledge in the prior art.

As a temperature measuring apparatus, a two-dimensional thermopile array has been used for detecting temperatures of objects to be measured. The two-dimensional thermopile is constituted by a plurality of thermopiles combined lengthwise and crosswise so that the amount of thermal changes in a certain detecting area can be measured. The thermopile is made by combining a plurality of thermocouples to increase the output voltage. For example, conventionally, such a two-dimensional thermopile array has been installed on a ceiling plane of a microwave oven as a temperature measuring apparatus for measuring the temperature of an object to be heated in the microwave oven in a non-contact manner.

Concretely, as disclosed by Japanese Unexamined Laid-open Patent Publication No. 2001-355853, in a microwave oven, a turn table is set as a temperature measuring area of a two-dimensional thermopile array so that the temperature distribution of an object placed on the turn table can be measured by the two-dimensional thermopile array.

The technique using the aforementioned two-dimensional thermopile array can also be applied to a means for detecting existence of a human body. For example, an illuminating lamp having a built-in two-dimensional thermopile array for detecting a human body has been proposed. A thermopile can also be used for detecting occurrence of fire or existence of human bodies based on the thermal change amount. Among other things, in recent years, a thermopile has been greatly expected to be used in fire alarms and/or security devices for detecting, e.g., human bodies (see, e.g., Japanese Unexamined Laid-open Patent Publication No. 2000-223282).

However, the aforementioned background technique had the following drawbacks. That is, the temperature information of an object disposed in the detecting area is obtained by adding the temperature of the thermopile itself to a relative temperature difference between the temperature of the detecting area and that of the thermopile. The temperature of the thermopile itself is detected by a thermistor as a thermal sensor, and the relative temperature difference is detected by the thermopile.

In manufacturing such thermopiles and thermistors, however, manufacturing dispersion may occur, resulting in different characteristics, which in turn may cause measuring errors. Even if thermopiles and thermistors have uniform accuracy, during the assembling steps, errors may occur, which also results in different characteristics. Thus, it was very difficult to obtain a temperature measuring apparatus having measurement accuracy falling within a predetermined range.

Furthermore, if a strict selection test is performed to secure uniform accuracy, a number of products will be deemed as defective products, resulting in an increased sales price. In other words, it was difficult to provide a temperature measuring apparatus with high accuracy at low cost.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a temperature measuring apparatus with a temperature correction function, comprising:

a light receiving portion having a plurality of light receiving units for measuring heat quantity of divided temperature detecting area, the light receiving portion measuring a relative temperature difference between each of the light receiving units and its corresponding divided temperature detecting area in a non-contact manner;

a thermal sensor for detecting a temperature of each of the plurality of light receiving units;

a calculation portion for calculating a temperature of each of the divided temperature detecting areas based on the temperature obtained by the thermal sensor and the relative temperature difference obtained by the light receiving portion;

a correction information holding portion for holding correction information on known reference temperatures of the temperature detecting area and its corresponding calculated results outputted from the calculation portion obtained when heat quantity of the temperature detecting area is set to the reference temperature; and a correction portion for correcting the calculated result of the calculation portion based on the correction information.

In some examples, in the temperature measuring apparatus, the light receiving portion is preferably constituted by a two-dimensional thermopile array.

In some examples, in the temperature measuring apparatus, it is preferable that the correction portion corrects the calculated result of the calculation portion utilizing a linear graph connecting a first corrected result obtained by the correction portion and a second corrected result obtained by the correction portion.

In some examples, in the temperature measuring apparatus, it is preferable that the correction portion corrects the calculated result of the calculation portion utilizing a function showing a temperature characteristic obtained based on a plurality of the calculated results obtained by the calculation portion.

In some examples, in the temperature measuring apparatus, it is preferable that the function is obtained by using a least squares method.

In some examples, in the temperature measuring apparatus, it is preferable that the temperature measuring apparatus is applied to a heat ray detector.

Among other potential advantages, some embodiments can provide a temperature correction processing device equipped with a plurality of light receiving units for measuring heat quantity of divided detecting areas, the temperature correction processing device comprising:

a light receiving portion configured to measure a relative temperature difference between each of the light receiving units and its corresponding divided detecting area in a non-contact manner;

a temperature measuring portion configured to measure a temperature of the light receiving units;

a calculation portion configured to calculate a temperature of each of the divided detecting areas based on the temperature from the temperature measuring portion and the relative temperature difference from the light receiving portion and output the calculated result;

a correction information holding portion configured to hold correction information on a known reference temperature in the detecting area and the calculated result from the calculating portion obtained when heat quantity of the detecting area is set to the reference temperature; and a correction portion configured to correct the calculated result based on the correction information.

In some embodiments, in the temperature correction processing device, it is preferable that the light receiving portion is constituted by a two-dimensional thermopile array.

In some embodiments, in the temperature correction processing device, it is preferable that the correction portion corrects the calculated result of the calculation portion utilizing a linear graph connecting a first corrected result obtained by the correction portion and a second corrected result obtained by the correction portion.

In some embodiments, in the temperature correction processing device, it is preferable that the correction portion corrects the calculated result of the calculation portion utilizing a function showing a temperature characteristic obtained based on a plurality of the calculated results obtained by the calculation portion.

In some embodiments, in the temperature correction processing device, it is preferable that the function is obtained by using a least squares method.

In some embodiments, in the temperature correction processing device, it is preferable that the temperature measuring apparatus is applied to a heat ray detector.

According to other embodiments of the present invention, a temperature measuring apparatus, comprising:

a light receiving portion having a plurality of light receiving units for measuring heat quantity of divided temperature detecting area, the light receiving portion measuring a relative temperature difference between each of the light receiving units and its corresponding divided temperature detecting area in a non-contact manner;

a thermal sensor for detecting temperature of the light receiving portion;

a calculation portion for calculating a temperature of each of the divided temperature detecting areas based on the temperature obtained by the thermal sensor and the relative temperature difference obtained by the light receiving portion;

a reference calculated result holding portion for holding a relation represented by a linear graph connecting a first reference calculated result of a first known temperature and a second reference calculated result of a second known temperature; and a temperature predicting portion for predicting a temperature of an object from the calculated result obtained by the calculation portion by utilizing a relation represented by the linear graph.

In some examples, in the temperature measuring apparatus, it is preferable that the light receiving portion is constituted by a two-dimensional thermopile array.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

A preferable embodiment of the present invention will be explained with reference to the attached drawings. The following explanation will be directed to a temperature measuring apparatus using a thermopile-type far infrared ray area sensor. However, it should be understood that the present invention is not limited to the above and can also be applied to various applications required to measure a surface temperature of an object for detecting, e.g., occurrence of fire or existence of an object such as a human body.

Figure 1:
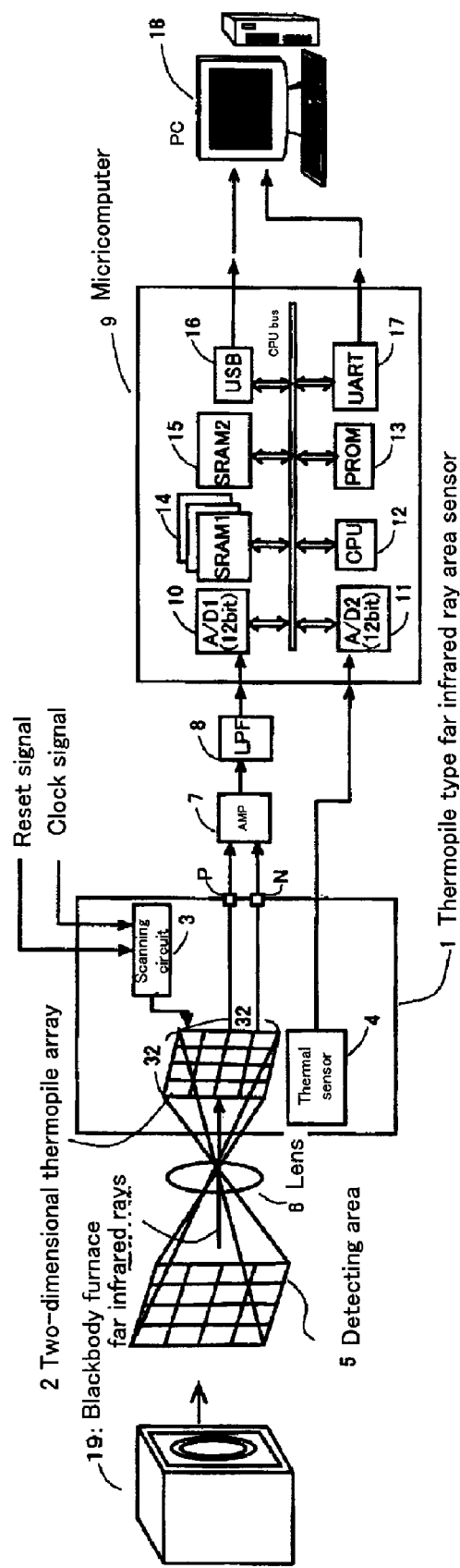
FIG. 1 is an entire schematic block diagram showing a temperature measuring apparatus according to an embodiment of the present invention.

FIG. 1 is a schematic block diagram showing a temperature measuring apparatus according to an embodiment of the present invention. In this apparatus, the thermopile type far infrared ray area sensor 1 is provided with a two-dimensional thermopile array 2, a scanning circuit 3, and a thermal sensor 4.

In FIG. 1, the reference numeral "5" denotes a detecting area which is a temperature measuring targeted area. The image of the detecting area 5 is introduced into the thermopile type far infrared ray area sensor 1 through a lens 6 in a reduced manner. The two-dimensional thermopile array 2 mounted in the thermopile-type far infrared ray area sensor 1 generates weak electromotive force corresponding to the amount of far infrared ray irradiated from the detecting area 5 via the lens 6 at each area section of the 32 (height)×32 (width) divided area sections of the entire area of the thermopile array 2.

Based on the weak electromotive force, the two-dimension thermopile array 2 obtains the thermal information of each area section of the detecting area 5.

The thermal information of each area section of the detecting area 5 actually obtained by the two-dimensional thermopile 2 is a temperature difference between each section of the detecting area 5 and the corresponding portion of the two-dimensional thermopile array 2. The two-dimensional thermopile array 2 can only obtain the temperature difference every divided area section of the divided detecting area 5.

The temperature of the two-dimensional thermopile array 2 itself can be measured by the thermal sensor 4.

Accordingly, the temperature of each of the divided area sections of the detecting area 5 which are divided into 32 (height)×32 (width) sections can be obtained by calculating the temperature information from the thermal sensor 4 and the temperature information of each area section of the detecting area 5 obtained by the two-dimension thermopile array 2 using the microcomputer 9.

Clock signals and reset signals are inputted into the scanning circuit 3 mounted in the thermopile type far infrared ray area sensor 1. The scanning circuit 3 initializes the value of the counter mounted in the scanning circuit 3 every input of reset signal to return the value into zero.

The value of the counter mounted in the scanning circuit 3 is incremented one by one in synchronization with the rising of the inputted clock signal.

The 32×32 divided area sections of the two-dimensional thermopile array 2 have respective addresses with address values increasing from the upper left side thereof toward the lower right side. Utilizing the counter value which will be incremented one by one, the scanning circuit 3 outputs an address value allotted to the two-dimensional thermopile array 2 to each of the divided area sections of the two-dimensional thermopile array 2 in order.

The two-dimensional thermopile array 2 to which the addresses are allotted outputs the information on the temperature difference obtained every corresponding area section as a potential difference (voltage) in order.

The potential difference will be outputted via the P terminal and the N terminal, which are output terminals of the thermopile type far infrared ray area sensor 1. The P terminal is a P channel terminal with a positive polar, and the N terminal is an N channel terminal with a negative polar.

The potential difference outputted from the thermopile type far infrared ray area sensor 1 via the P terminal and the N terminal will be inputted to the amplifier 7. The amplifier 7 includes a difference amplifier circuit, and amplifies the potential difference depending on the potential difference between the P terminal and the N terminal to output the amplified potential difference as an output signal.

The amplifier 7 is required to amplify the potential difference at a high magnification rate since the electromotive force to be generated by the two-dimensional thermopile array 2 is weak.

In this embodiment, the amplifier 7 amplifies the potential difference between the P terminal and the N terminal by approximately several thousand times to output to the lowpass filter (hereinafter referred to as "LPF") 8. The LPF 8 is a lowpass filter constituted by resistors and capacitors, and smoothens the quickly increased noise components among signals contained in the potential difference amplified by the amplifier 7 and then outputs the smoothened signal to the 12 bit A/D converter 10 in the microcomputer 9. The 12-bit A/D converter 10 converts the analog signal inputted from the LPF 8 into 12-bit digital data.

The thermal sensor 4 mounted in the thermopile type far infrared ray area sensor 1 is configured to output the temperature information of each area section of the two-dimensional thermopile array 2 as a potential difference.

The temperature information of the two-dimensional thermopile array 2 is inputted to the 12-bit A/D converter 11 to be converted into 12-bit digital data.

The CPU 12 in the microcomputer 9 obtains the temperature information of each of the area sections, which are the 32×32 divided area sections of the two-dimensional thermopile array 2, based on the temperature information of the two-dimensional thermopile array 2 itself and the voltage output showing the aforementioned temperature difference of each of the area sections of the two-dimensional thermopile array 2.

The aforementioned temperature information obtained by the CPU 12 is a relative temperature showing the difference between the temperature of each area section of the detecting area 5 and the temperature of each area section of the two-dimensional thermopile array 2. In other words, the obtained temperature information shows how higher or lower the temperature of each area section of the detecting area 5 is in comparison with the temperature of the two-dimensional thermopile array 2.

In order to obtain the temperature information of each area section of the detecting area 5, the CPU 12 adds the temperature information of the two-dimensional thermopile array 2 itself to the relative temperature difference between the temperature of each area section of the detecting area 5 and the temperature of each area section of the two-dimensional thermopile array 2.

The CPU 12 makes the SRAM1 14 store the obtained temperature information of each area section of the detecting area 5 via the CPU bus. The temperature information of the 32×32 area sections to be measured once, which is called one frame, will be processed all together as a single information unit.

In this embodiment, the temperature measuring of the detecting area 5 is executed three times per second, and the SRAM1 14 stores the most recent three measured results. The SRAM1 14 erases the oldest measured result and stores the new measured result to keep updating measured results every new measurement. The series of processing is executed by the program stored in the PROM 13. The PROM 13 is constituted by a nonvolatile memory called "flash memory," so that the program can be rewritten conveniently, e.g., in cases where the program is required to be amended.

In FIG. 1, the SRAM1 14 and SRAM2 15 are illustrated separately. In a memory to be used for a CPU, a memory is generally administered in such a manner that the entire memory is divided into a plurality of sections. Upon request of an access to the memory from the CPU, one of the sections is selected among the entire sections of the memory for reading or writing. The section of the memory is called "bank."

In place of the aforementioned SRAM1 14 and SRAM2 15, a single SRAM in which the entire memory is divided into two banks, i.e., SRAM1 and SRAM2, can be used. In this case, since a part of the built-in memory address decoder can be shared, the chip area of the microcomputer 9 can be decreased.

Now, the temperature information of each area section of the detecting area 5 may have a peculiar characteristic in measurement accuracy every end product because of dispersion of the two-dimensional thermopile array 2 and thermal sensor device 4. Accordingly, in order to secure uniform accuracy of the temperature measuring apparatus as an end product, strict selection of end products by inspection or a correction of peculiar characteristic of each end product will be inevitable. However, in the case of the strict selection of end products, a number of end products will be regarded as inferior products, resulting in an increased manufacturing cost. To reduce a manufacturing cost of an end product, it is preferable to correct the characteristic of each end product by corrections/amendments.

As a concrete correcting means, a device capable of correctly reproducing a set temperature, e.g., a blackbody furnace, is commonly used. For example, a blackbody furnace 19 shown in FIG. 1 is set to a certain temperature and then placed at the detecting area 5 to measure the temperature of the blackbody furnace 19.

In this case, if the two-dimensional thermopile array 2 and the thermal sensor 4 are accurate, the measured result should coincide with the set temperature of the blackbody furnace 19.

In fact, however, a two-dimension thermopile array 2 and a thermal sensor 4 include dispersion at its manufacturing and assembling steps, and therefore the end product may have different thermal characteristics. For example, in some cases, a measured temperature becomes higher than the actual temperature, a measured temperature becomes lower than the actual temperature, or thermal characteristics differ at measuring temperature. As explained above, in order to reduce the dispersion of each end product, strict selection of end products or a correction of a peculiar characteristic of each end product will be inevitable. In this embodiment, the thermal characteristic of each end product is corrected to reduce the dispersion among end products so that end products with uniform characteristic falling within a certain range can be supplied to consumers at a reasonable cost.

In order to know the temperature characteristics of each end product, it is preferable to perform temperature tests using a blackbody furnace 19, which covers from a low temperature and a high temperature, at least two times. For example, the temperature tests are performed at 5° C. in a low temperature range and 40° C. in a high temperature range. If the test results revealed that the actually measured temperatures included errors, an amendment for making the actually measured temperature approach the ideal value which is the actual temperature of the blackbody furnace 19.

Figure 3:
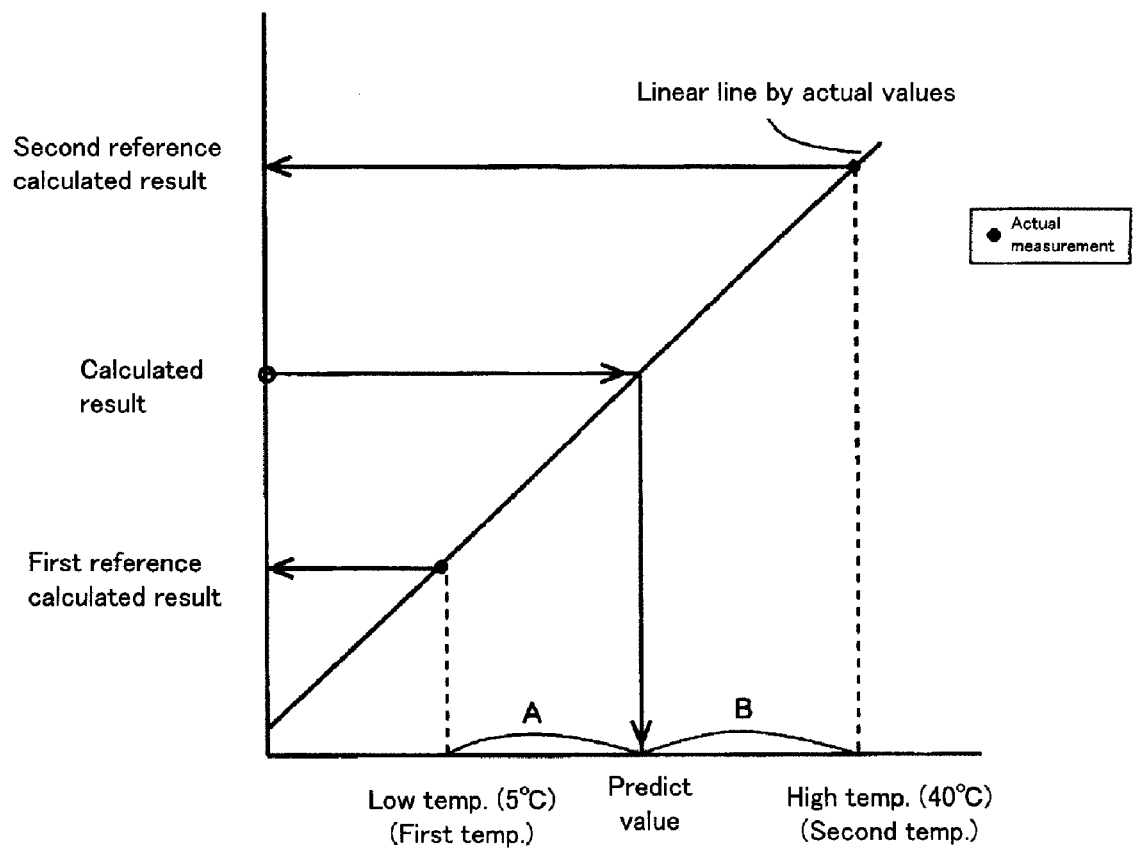
FIG. 3 is an example of a graph for predicting a measured temperature according to an embodiment of the present invention.
Figure 4:
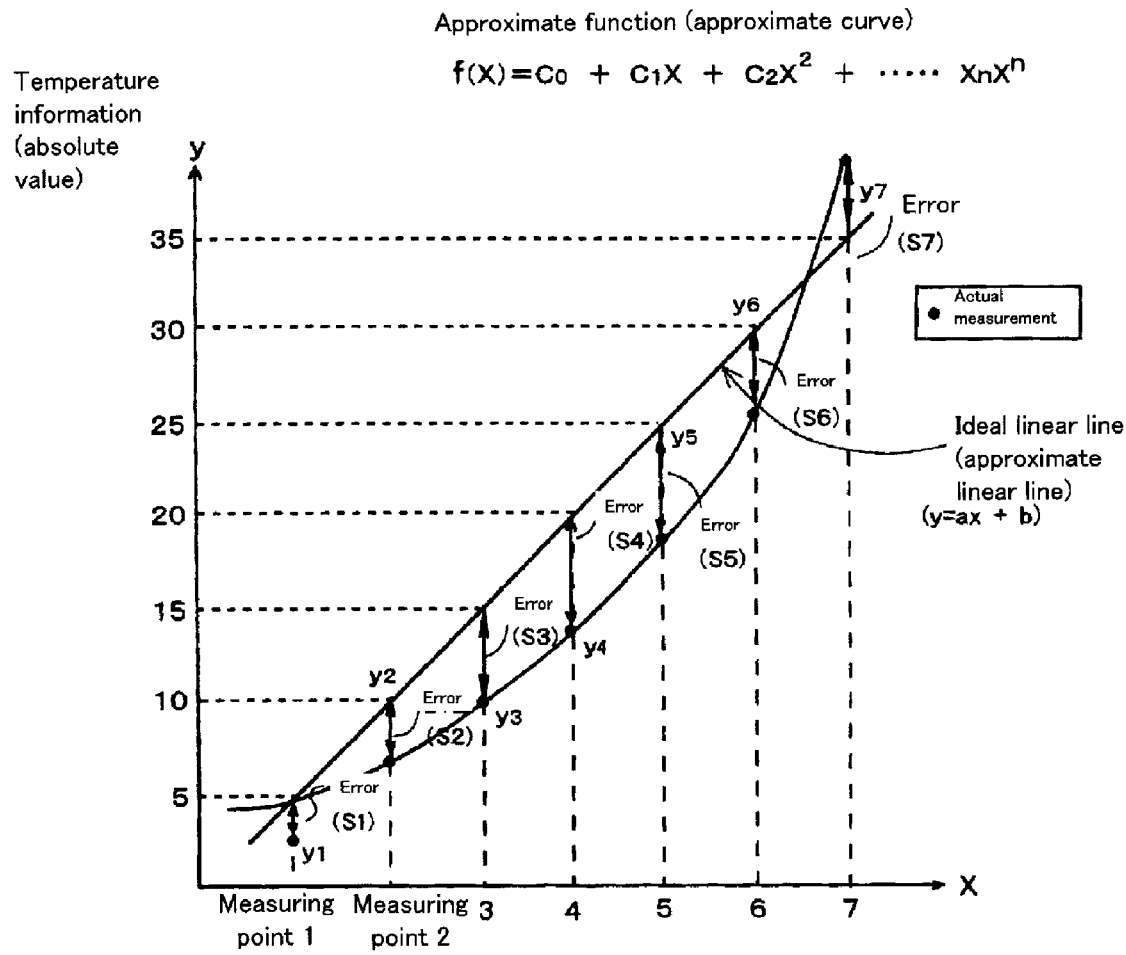
FIG. 4 is an example of a graph showing a least squares method for correcting the measured temperatures according to an embodiment of the present invention.

The method of the amendment will be explained with reference to FIGS. 2 to 4.

Figure 2A:
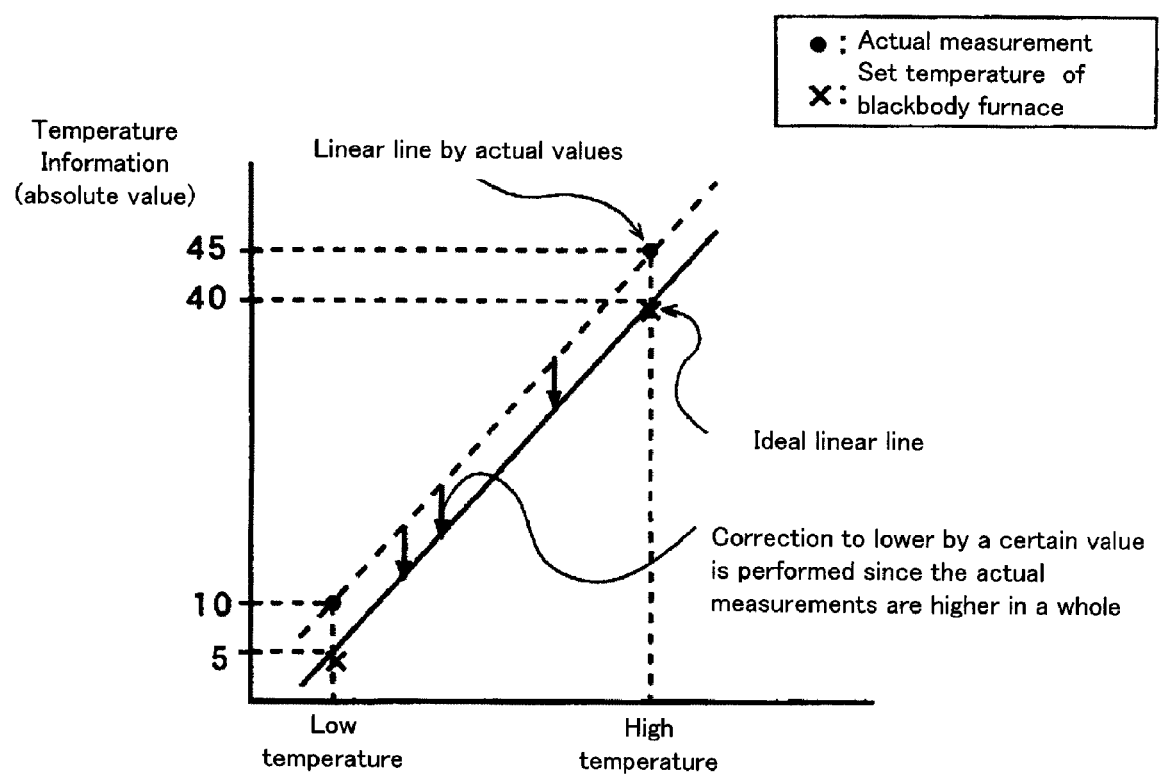
FIG. 2A is an example of a graph for correcting a measured temperature according to an embodiment of the present invention.
Figure 2B:
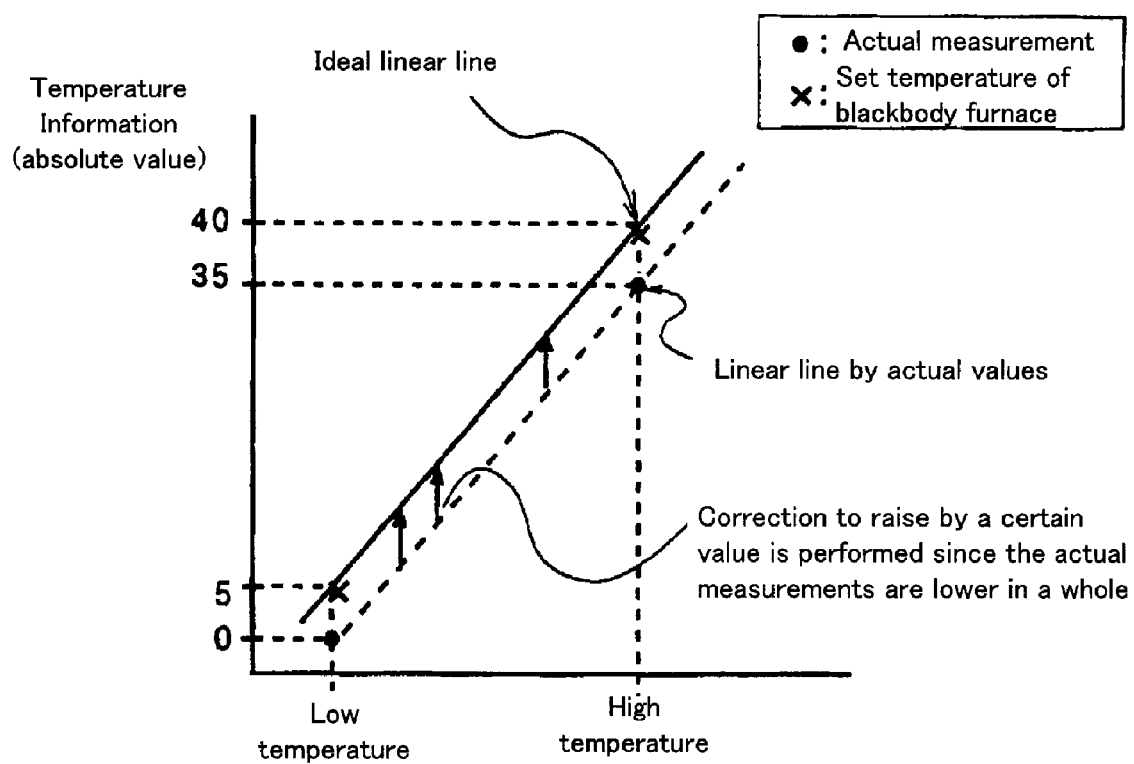
FIG. 2B is another example of a graph for correcting a measured temperature according to an embodiment of the present invention.

FIG. 2A shows a case in which the measured temperature is higher than the actual temperature by a certain degree from a low temperature to a high temperature, and FIG. 2B shown a case in which the measured temperature is lower than the actual temperature by a certain degree from a low temperature to a high temperature. In both cases, if an error at a low temperature is nearly the same as an error at a high temperature, an effective correction/amendment can be performed by simply shifting all of temperatures to be measured downward or upward by a certain degree.

In the example shown in FIG. 2A, the measured temperatures measured by using the blackbody furnace 19 are higher than the actual temperature, i.e., the linear line, by a certain degree. Accordingly, a correction to lower a measured value by a certain degree is executed. In detail, in the case of FIG. 2A, since the measured degrees are higher than the actual temperatures by 5° C. at the low temperature and the high temperature, a correcting value of 5 is subtracted from the actually measured temperature to thereby obtain a corrected temperature. The correcting value for making the measured temperature approach the actual temperature is stored in the PROM 13.

On the other hand, in the example shown in FIG. 2B, the measured temperatures measured by using the blackbody furnace 19 are lower than the actual temperature, i.e., the linear line, by a certain degree. Accordingly, an amendment to heighten a measured temperature by a certain degree is executed. In detail, in the case of FIG. 2B, since the measured degrees are lower than the actual temperatures by 5° C. at the low temperature and the high temperature, a correcting value of 5° C. is added to the actually measured temperature to thereby obtain a corrected temperature. In the same manner as in the example shown in FIG. 2A, the correcting value for making the measured temperature approach the actual temperature is stored in the PROM 13.

The examples shown in FIGS. 2A and 2B reside in a concept that the actually measured temperature is corrected so as to approach an actual temperature, i.e., an ideal value, to thereby decrease an error. Unlike these examples, another example shown in FIG. 3 employs no ideal value. In the example shown in FIG. 3, assuming that temperatures to be measured will be on a linear line connecting the actually measured temperatures obtained by measuring only at two points, the actual temperatures will be determined.

For example, a blackbody furnace 19 is disposed at the detecting area 5 and sets to be a first temperature and a second temperature. In this example, the first temperature is set to 5° C. as a low temperature and the second temperature is set to 40° C. as a high temperature.

At the first temperature, a measurement is performed. Then, based on the outputs from the A/D converters 10 and 11, the temperature is calculated. The obtained calculated result is defined as a first reference calculated result. In the same manner, at the second temperature, a measurement is performed and the temperature is calculated. The obtained calculated result is defined as a first reference calculated result.

Then, the first reference calculated result corresponding to the first temperature and the second reference calculated result corresponding to the second temperature are connected to obtain a linear line. Thus, an actual temperature to be measured at the detecting area 5 can be predicted by considering the relationship shown by the linear line. In concrete, a measurement is performed and the temperature is calculated to obtain a calculated result. The calculated result is plotted on the Y-axis of the X-Y coordinate shown in FIG. 3. From the point on the Y-axis, a horizontal line is extended to the linear line to obtain an intersecting point on the linear line. Then, from the intersecting point on the linear line, a vertical line is downwardly extended to the X-axis to obtain an intersecting point on the X-axis. Thereafter, the actual temperature is predicted from the ratio of the distance A between the intersection point on the X-axis and the first temperature (i.e., 5° C.) to the distance B between the second temperature (i.e., 40° C.) and the intersection point on the X-axis.

As mentioned above, in the example shown in FIGS. 2A and 2B, a known temperature is measured at two points using a blackbody furnace 19 and then a linear line connecting the two points is obtained. Thereafter, the linear line is amended so as to approach an ideal linear line. In this case, however, the actually measured temperatures may contain errors at the time of measuring the temperatures. In some cases, the actually measured temperatures may contain large errors. But, in other cases, they may contain almost no error. The amount of errors differs depending on various factors, e.g., the amount of noise.

If the actually measured test temperatures include large errors, since the subsequent measured temperatures will be corrected based on the actually measured test temperatures, the corrected measured temperatures will be reflected by such errors. To avoid such problems, it is preferable to obtain test temperatures using the blackbody furnace not only at two points but also at a number of points.

In the case of obtaining test temperatures at a number of points, however, it becomes difficult to make the curve connecting the test temperatures approach a linear line. Accordingly, in such a case, a temperature correction in accordance with a least squares method is preferably performed.

Furthermore, a temperature characteristic of a two-dimensional thermopile array 2 does not exhibit an exact linear line and sometimes shows a quadratic curve. In cases where temperature characteristic exhibits a quadratic curve, the measurement errors can be minimized by executing temperature corrections in accordance with a least squares method.

Hereinafter, an example of a temperature correction method in accordance with a least squares method will be explained. When a reference temperature is measured using a blackbody furnace 19, the data and the measured temperature are represented by "x" and "y." In the example shown in FIG. 4, seven sampling results were obtained at seven different temperatures of the blackbody furnace 19. In this example, the approximate function (approximate curve) connecting the actually measured values does not coincide with an ideal linear line (approximate linear line) because of measurement errors, etc.

Provided that the blackbody furnace 19 is set to reference temperatures of x1, x2, x3 . . . in order and that the measured results are represented by y1, y2, y3 . . . , sampling results at N different reference temperatures are represented by the following formula 1.

$$(x_n, y_n), n=0,1,\ldots, N-1 \quad \text{(Formula 1)}$$

The approximate function to be obtained will be represented by the following formula 2.

$$f(x)=c_0+c_1x+c_2x^2+\ldots c_nx^n \quad \text{(Formula 2)}$$

In the ideal linear line, if the X-coordinate at the measuring point 1 is x1, the Y-coordinate will be a(x1)+b. The actually measured value at the measuring point 1 is x1 on the X-coordinate and y1 on the Y-coordinate. The difference between the ideal value and the actually measured value is called an prediction error, which can be represented by $S1=y1-[a(x1)+b]$.

In order to minimize the prediction error of the approximate function (approximate curve) shown by Formula 2, the coefficient Co-Cn of the formula 2 can be represented by the following formula 3 using square errors.

$$S = \sum_{n=0}^{N-1} (y_n - f(x_n))^2 \quad \text{(Formula 3)}$$

In the formula 3, ignoring the case in which the coefficient of x is larger than cubic, the formula will be represented by the following formula 4.

$$s_n=(y_n-c_0-c_1x_n-c_2x_n^2)^2 \quad \text{(Formula 4)}$$

In the formula 4, regarding the coefficient C0 to Cn, the partial differentiation value becomes zero at the minimum point. Regarding the coefficient C0 to C2, at the minimum point, the partial differentiation value becomes zero. Therefore, the following formula 5, formula 6, and formula 7 can be obtained.

$$\frac{dS}{dc_0} = 0 \rightarrow \sum_{n=0}^{N-1} (y_n - c_0 - c_1 x_n - c_2 x_n^2) = 0 \quad \text{(Formula 5)}$$

$$\frac{dS}{dc_1} = 0 \rightarrow \sum_{n=0}^{N-1} (y_n - c_0 - c_1 x_n - c_2 x_n^2)x_n = 0 \quad \text{(Formula 6)}$$

$$c_0 N + c_1 \sum_{n=0}^{N-1} x_n + c_2 \sum_{n=0}^{N-1} x_n^2 = \sum_{n=0}^{N-1} y_n \quad \text{(Formula 7)}$$

From the formula 5, the formula 6 and the formula 7, the following formula 8, formula 9 and formula 10 can be obtained.

$$c_0 \sum_{n=0}^{N-1} x_n + c_1 \sum_{n=0}^{N-1} x_n^2 + c_2 \sum_{n=0}^{N-1} x_n^3 = \sum_{n=0}^{N-1} x_n y_n \quad \text{(Formula 8)}$$

$$c_0 \sum_{n=0}^{N-1} x_n^2 + c_1 \sum_{n=0}^{N-1} x_n^3 + c_2 \sum_{n=0}^{N-1} x_n^4 = \sum_{n=0}^{N-1} x_n^2 y_n \quad \text{(Formula 9)}$$

$$\begin{pmatrix} N & \sum x_n & \sum x_n^2 \\ \sum x_n & \sum x_n^2 & \sum x_n^3 \\ \sum x_n^2 & \sum x_n^3 & \sum x_n^4 \end{pmatrix} \begin{pmatrix} c_0 \\ c_1 \\ c_2 \end{pmatrix} = \begin{pmatrix} \sum y_n \\ \sum x_n y_n \\ \sum x_n^2 y_n \end{pmatrix} \quad \text{(Formula 10)}$$

The aforementioned formula 8, formula 9 and formula 10 can be represented by the following matrix.

$$(A_{i,j})(c_i)=(B_i) \quad \text{(Formula 11)}$$

From the formula 11, a simultaneous equation with unknown quantities of Co-C2 can be obtained. When the coefficient matrix, the unknown vector and the constant vector are represented by Aij, Ci and Bi, the formula 11 can be represented as follows.

$$(A_{i,j})(c_i)=(B_i) \quad \text{(Formula 12)}$$

In the formula 12, when the maximum order of the approximate function is n, the elements of A and B can be represented by the following formula 13.

$$A_{i,j} = \sum_{n=0}^{N-1} x_n^{i+j},$$

$$B_i = \sum_{n=0}^{N-1} x_n^j y_n \quad (i = 0, 1, \ldots, n, \quad j = 0, 1, \ldots, n)$$

(Formula 13)

A quadratic least square polynominal expression is obtained from the reference input date represented by the formula 1 to derive a simultaneous equation. By solving the simultaneous equation, Ci can be obtained. By substituting the Ci in the formula 2 and a newly inputted data x, the temperature can be calculated.

Since the output characteristics of a thermopile are represented by a quadratic curve, by obtaining a simultaneous equation from a plurality of sampling points and registering the obtained Co to C2 in a ROM, a corrected temperature considering the thermopile characteristics can be obtained from the inputted data.

According to the aforementioned method, high speed and accurate conversion can be performed without requiring many correcting samplings. However, in order to enhance the accuracy, the aforementioned processing is preferably performed every pixel unit to obtain a corrected temperature. Thus, a least squares method enables the actually measured temperature to approach the ideal value.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A temperature measuring apparatus with a temperature correction function, comprising:
    a two-dimensional thermopile array having a plurality of thermopiles for measuring heat quantity of divided temperature detecting areas, the thermopile array measuring a relative temperature difference between each of the thermopiles and each of the divided temperature detecting areas corresponding to each of the thermopiles in a non-contact manner;
    a thermal sensor for detecting a temperature of each of the plurality of thermopiles;
    a calculation portion for calculating a temperature of each of the divided temperature detecting areas based on the temperature obtained by the thermal sensor and the relative temperature difference obtained by the thermopile array;
    a correction information holding portion for holding correction information on a temperature difference between a known reference temperature of the divided temperature detecting areas and a calculated result outputted from the calculation portion obtained when the divided temperature detecting areas are set to the known reference temperature; and
    a correction portion for correcting a calculated result of the calculation portion obtained at the time of actual temperature measurement based on the correction information.

2. The temperature measuring apparatus as recited in claim 1, wherein the correction portion corrects the calculated result of the calculation portion utilizing a linear graph connecting a first corrected result obtained by the correction portion and a second corrected result obtained by the correction portion.

3. The temperature measuring apparatus as recited in claim 1, wherein the correction portion corrects the calculated result of the calculation portion utilizing a function showing a temperature characteristic obtained based on a plurality of the calculated results obtained by the calculation portion.

4. The temperature measuring apparatus as recited in claim 3, wherein the function is obtained by using a least squares method.

5. The temperature measuring apparatus as recited in claim 1, wherein the temperature measuring apparatus is applied to a heat ray detector.

6. A temperature correction processing device for measuring heat quantity of divided detecting areas, the temperature correction processing device comprising:
    a two-dimensional thermopile array having a plurality of thermopiles configured to measure a relative temperature difference between each of the plurality of thermopiles and each of the divided temperature detecting areas corresponding to each of the plurality of thermopiles in a non-contact manner;

a temperature measuring portion configured to measure a temperature of each of the plurality of thermopiles;

a calculation portion configured to calculate a temperature of each of the divided detecting areas based on the temperature from the temperature measuring portion and the relative temperature difference from the thermopile array and output the calculated result;

a correction information holding portion configured to hold correction information on a temperature difference between a known reference temperature of the divided detecting areas and a calculated result from the calculating portion obtained when the divided detecting areas are set to the known reference temperature; and a correction portion configured to correct a calculated result obtained at the time of actual temperature measurement based on the correction information.

7. The temperature correction processing device as recited in claim 6, wherein the correction portion corrects the calculated result of the calculation portion utilizing a linear graph connecting a first corrected result obtained by the correction portion and a second corrected result obtained by the correction portion.

8. The temperature correction processing device as recited in claim 6, wherein the correction portion corrects the calculated result of the calculation portion utilizing a function showing a temperature characteristic obtained based on a plurality of the calculated results obtained by the calculation portion.

9. The temperature correction processing device as recited in claim 8, wherein the function is obtained by using a least squares method.

10. The temperature correction processing device as recited in claim 6, wherein the temperature measuring apparatus is applied to a heat ray detector.

11. A temperature measuring apparatus, comprising:

a two-dimensional thermopile array having a plurality of thermopiles for measuring heat quantity of divided temperature detecting areas, the thermopile measuring a relative temperature difference between each of the thermopiles and each of the divided temperature detecting areas corresponding to each of the thermopiles in a non-contact manner;

a thermal sensor for detecting a temperature of each of the thermopiles;

a calculation portion for calculating a temperature of each of the divided temperature detecting areas based on the temperature obtained by the thermal sensor and the relative temperature difference obtained by the thermopile array;

a reference calculated result holding portion for holding a relation represented by a linear graph connecting a first reference calculated result of a first known temperature and a second reference calculated result of a second known temperature; and a temperature predicting portion for predicting a temperature of an object from the calculated result obtained by the calculation portion by utilizing the relation represented by the linear graph.

* * * * *